United States Patent
Cornwell

(10) Patent No.: US 6,450,550 B1
(45) Date of Patent: Sep. 17, 2002

(54) TUBE FITTING

(75) Inventor: James P. Cornwell, Erie, PA (US)

(73) Assignee: R. Conrader Company, Erie, PA (US)

(*) Notice: Subject to any disclaimer, the term of this patent is extended or adjusted under 35 U.S.C. 154(b) by 27 days.

(21) Appl. No.: 09/658,314

(22) Filed: Sep. 8, 2000

Related U.S. Application Data

(60) Provisional application No. 60/153,131, filed on Sep. 9, 1999.

(51) Int. Cl.$^7$ ............................................. F16L 19/06
(52) U.S. Cl. .................................................... 285/340
(58) Field of Search ............................... 285/340, 305, 285/319, 348

(56) References Cited

U.S. PATENT DOCUMENTS

| | | |
|---|---|---|
| 3,576,335 A | 4/1971 | Kowal et al. |
| 3,596,934 A | 8/1971 | DeCenzo |
| 3,999,783 A | 12/1976 | Legris |
| 4,150,847 A | 4/1979 | DeCenzo |
| 4,181,329 A * | 1/1980 | Helm .......................... 285/305 |
| 4,635,975 A * | 1/1987 | Campbell .................... 285/340 |
| 4,867,489 A | 9/1989 | Patel |
| 5,024,468 A | 6/1991 | Burge |
| 5,230,539 A | 7/1993 | Olson |
| 5,284,582 A * | 2/1994 | Yang ........................... 285/340 |
| 5,286,066 A * | 2/1994 | Yang ........................... 285/305 |
| 5,413,147 A | 5/1995 | Moreiras et al. |
| 5,496,076 A * | 3/1996 | Lin .............................. 285/340 |
| 5,527,072 A * | 6/1996 | Norkey ........................ 285/319 |
| 5,553,901 A * | 9/1996 | Serot ........................... 285/340 |
| 5,584,513 A | 12/1996 | Sweeny et al. |
| 5,683,120 A | 11/1997 | Brock et al. |

FOREIGN PATENT DOCUMENTS

GB    472773    9/1937

OTHER PUBLICATIONS

Parker Fluid Connectors, Technical Bulletin, p. F–16, Parker Hannifin Corporation, Parflex Division, Ravenna, Ohio.
Alkon Brass Fittings, Catalog, Front Cover, Back Cover and p. 2, Alkon Corporation, Pine Brook, New Jersey, 1993.

* cited by examiner

Primary Examiner—Lynne H. Browne
Assistant Examiner—Aaron Dunwoody
(74) Attorney, Agent, or Firm—Edward W. Goebel, Jr.; MacDonald, Illig, Jones & Britton LLP

(57) ABSTRACT

A fitting for retaining a cylindrical tube includes a fitting body having a hole extending through it. The hole includes a cylindrical main cavity located at one end of the body into which an end of the tubing can be inserted. A circular retaining shoulder is located on the tubing so that the shoulder is within the main cavity when the tubing is placed in the fitting. A closure, such as a snap ring, is installed at the open end of the main cavity to hold the shoulder within the main cavity. The closure has a circular hole within it to receive the tubing. An elastomeric seal is mounted within the main cavity between the shoulder and the closure. The inner diameter and the outer diameter of the seal cause the seal to be compressed between the tubing and the wall of the main cavity. A preselected shoulder clearance gap is formed between the retaining shoulder and the main cavity, a preselected closure clearance gap is formed between the tubing and a hole in the closure, and an axial gap is formed within the axial length of the main cavity so that the shoulder can move freely within the main cavity as a result of these gaps while being retained within the cavity so as to minimize fatigue on the tubing while the tubing is being retained by the fitting.

10 Claims, 9 Drawing Sheets

TUBE FITTING

This application claims the benefit of U.S. Provisional Application No. 60/153,131 filed on Sep. 9, 1999.

BACKGROUND OF THE INVENTION

This invention relates to tube fittings for systems or equipment using tubing to conduct gasses or liquids and more particularly relates to tube fittings for retaining tubes used with vibrating equipment such as air compressors and hydraulic and pneumatic systems for transportation vehicles.

Reciprocating equipment such as air compressors operate at elevated temperatures, deliver a pulsating stream of fluid and vibrate considerably. Hydraulic and pneumatic systems used for controls and for brakes in trucks, buses, off-highway vehicles, locomotives and other transportation equipment also operate in hot environments. Components of these systems are subject to vibration caused by engines propelling the equipment and as a result of uneven roadways over which the equipment travels. Air compressors and other pneumatic and hydraulic equipment use fittings to connect tubing to conduct gasses and liquids to and from that equipment. Due to strong market competition, manufacturers are in a constant race to design and manufacture components, such as tube fittings for this type of equipment, more inexpensively, while maintaining a required level of quality and durability.

The various types of fittings currently in use all have their advantages, as well as offsetting disadvantages.

Compression fittings compress metal ferrules about a tube within the fitting to hold the tube. While they are one of the least expensive types of fittings, installation of tubes into compression fittings is difficult. FIG. 1 shows a compression fitting 20 having a body 22 with a bore 24 at one end surrounded by male threads 26. A nut 28 fits on the threads 26 of the body 22. A ferrule 30 is placed over a tube 32 which is to be held by the fitting 20. The ferrule 30 has sloped end surfaces 33 which allow it to be compressed by an inside surface 34 of the bore 24. The tube 32, with the ferrule over it, is inserted into the fitting body and the nut 28 is threaded onto the threads 26 of the body 22. The nut 28 is tightened with a wrench to compress the ferrule 30 around the tube, securing and sealing the tube.

When metal ferrules are used to crimp metal tubing, early tube failures often occur due to fatigue caused by machine vibration. Crimping also reduces the inside diameter of the tube, reducing flow capacity. Some compression type fittings use soft Teflon or silicone ferrules in place of metal ferrules. While the soft ferrules may minimize tube breakage due to fatigue, the soft ferrules are known to fail prematurely by wearing out and leaking. The soft ferrules also make assembly more difficult.

Flare fittings have been used to retain tubes for applications having significant vibrations, such as air compressors. A flare fitting 36 is shown in FIG. 2. The flare fitting 36 has a body 38 having a bore 40 at one end, surrounded by internal threads 42 forming a nut. The flare fitting 36 also includes a retainer 44 having external threads 46 which intermesh with the threads 42 on the body 38. The retainer 44 has a central hole within it into which tubing 48 is inserted. A flare 50 is formed in the end of the tubing 48 by a flaring tool to allow the nut at the end of the body 38, surrounding the tubing adjacent the flare, and an internal end 52 of the retainer 44 to clamp the flare 50 between them and hold the tubing 48 tightly within the fitting body 38.

Flare type fittings do not reduce tube life to the same extent as compression fittings, since they do not crimp the tubing and they also do not reduce the inside diameter of the tube. However, flare fittings experience failures due to fatigue at the areas of the flared tubing which contacts the members of the fitting. Additionally flare fittings are more expensive to manufacture and assemble because they tend to be larger in size and require the user to flare the tubing and are difficult to assemble.

Push-in tube fittings of the type shown in FIG. 3 allow a tube to be connected to the fitting by pushing the tube into the fitting. A push-in fitting 53 includes a body 54 and a gripper formed by axially extending fingers 56 of a cylindrical collet 58. Each of the distal ends 60 of the fingers 56 comprises a cam section. The cam section causes the fingers 56 to be deflected as the collet 58 is inserted into the body 54. The cam section 60 can move outwardly into an enlarged central cylinder formed by camming surface 62 within the body 54. An O-ring 64 is inserted within the body 54 at the end of the central cylinder 66 so as to form a seal about tubing 68 when it is inserted within the fitting 53.

When the tubing 68 is inserted through the collet 58, the fingers 56 are moved axially in an outward direction. The cam 60 bears against the camming surface 62 which allows the tube to be pushed within the body 54. However, the camming surface 62 causes the fingers 56 to compress about the tubing 68 to prevent it from being removed from the fitting 53 whenever a force attempts to pull the tubing 68 out of the collet 58. The force of the fingers 56 about a metal tubing causes the tubing or the fingers 56 to fatigue in areas where it is gripped throughout the use of the push-in fitting on equipment which is subject to vibration. This fatigue ultimately causes a failure of the tubing or the fingers 56.

Other push-in fittings include a fitting assembly having a retaining ring with gripping teeth about its periphery rigidly installed within the body to hold tubing. These fittings also include an O-ring within the fitting to act as a seal. One such push fitting 70, shown in FIG. 4, comprises a fitting body 72 and a nut 74 having internal screw threads which screw onto screw threads at the tube receiving end of the body 72. An O-ring seal 76 is mounted within a cavity 78 in an end of the body 72. A retaining ring 80 having gripping teeth 82 is mounted within a cavity inside the nut 74. A spacer 84 is inserted within the cavity of the nut 74 between the retaining ring 80 and the body 72 of the fitting 70. The spacer 84 protects the O-ring seal 76 from the gripping teeth 82. The surface of the spacer 82 adjacent the gripping teeth 82 is canted to allow room for the gripping teeth to bend as a tube 86 is installed.

The tube 86 is installed into the push fitting 70 by sliding the tube 86 through the nut 74 and the gripping teeth 82 of the retaining ring 80. The tube is held in place by the gripping teeth 82. An end 88 of the nut 74 holds the retaining ring 80 in place after the nut 74 is tightened onto screw threads 90 of the body 72.

Currently available push fittings which use retaining rings do not work well with metal tubing because the tubing fails due to fatigue where it is held by gripping teeth, such as gripping teeth 82 shown in FIG. 4. The gripping teeth of retaining rings normally do not fail because the retaining rings are made out of spring steel which is harder than the material of the tubing. Thus, available push fittings using retaining rings require the use of plastic tubing with them. Since vibrating equipment, such as air compressors and transportation systems, operate at elevated temperatures, the tubing must be made out of more expensive, high temperature plastics such as Teflon.

Among the many patents which disclose prior art fittings of the type described above are U.S. Pat. No. 3,999,783

Andre Legris issued Dec. 28, 1996; U.S. Pat. No. 4,867,489 Hiralal V. Patel issued Sep. 19, 1989; U.S. Pat. No. 5,024,468 Donald G. Burge issued Jun. 18, 1991; U.S. Pat. No. 5,230,539 Darwin C. Olson issued Jul. 27, 1993; U.S. Pat. No. 5,584,514 Michael A. Sweeney et al. issued Dec. 17, 1996; and U.S. Pat. No. 5,683,120 David J. Brock et al. issued Nov. 4, 1997.

SUMMARY OF THE INVENTION

In accordance with this invention, a fitting for retaining a cylindrical tube includes a fitting body having a hole extending through it. The body also has a cylindrical main cavity located at one end into which an end of the tubing will be inserted. A circular retaining shoulder is locatable on the tubing and within the main cavity when the tubing is placed in the fitting. A closure is installable at the open end of the main cavity to hold the shoulder within the main cavity. The closure has a circular hole within it to receive the tubing. An elastomeric seal is mounted within the main cavity between the shoulder and the closure. The seal has an inner diameter and an outer diameter which cause the seal to be compressed between the tubing and the wall of the main cavity.

The outer diameter of the retaining shoulder is sufficiently smaller than the diameter of the cylindrical main cavity so as to form a preselected shoulder clearance gap. The diameter of the closure hole is sufficiently larger than the outside diameter of the tubing so as to form a preselected closure clearance gap. Additionally, the axial length of the main cavity is sufficiently larger than the combined widths of the shoulder and of the seal to form a preselected axial gap. The shoulder clearance gap and the closure clearance gap allow sufficient side play between the tubing and the fitting and the axial gap allows sufficient axial play between the tubing and the fitting so that at least a portion of the shoulder can move freely between an end wall of the main cavity and the seal to an extent which minimizes fatigue on the tubing within the main cavity.

The retaining shoulder can be any of a number of possible structures. One preferred structure of the retaining shoulder includes a retaining ring having a plurality of inwardly extending teeth which allow a tube to be inserted into the fitting and engage and hold the tubing against withdrawal from the fitting. This structure also includes a washer located between the retaining ring and the seal. The outer diameter of the washer is the diameter of the shoulder in that the washer normally has an outer diameter larger than that of the retaining ring to protect the retaining ring from contact with the axial wall of the main cavity. The inside diameter of the washer is larger than the outside diameter of the tubing. As a result, for this shoulder structure the shoulder clearance gap comprises the sum of the gap between the outside diameter of the washer and cylinder and the gap between the inside diameter of the washer and the tube being retained.

Similarly, the closure can be any of a number of different structures. Where any of these structures includes a washer, normally used adjacent the seal, the inner diameter of the washer is usually smaller than any other component of the closure. Thus, the inner diameter of the washer is the effective diameter of the closure hole. The preselected closure clearance equals the sum of the gap between the inner diameter of the washer and outer diameter of the tube and the gap between the outer diameter of this washer and the diameter of the main cylinder.

For some applications of this invention the body includes a cylindrical guide cavity located within it next to the main cavity to receive the end of the tubing inserted into the fitting. The guide cavity has a diameter sufficiently greater than the diameter of the tubing to form a guide gap of the size which also allows side play to occur to an extent which minimizes fatigue on the tubing within the cavity.

This invention does not reside in any one of the features of the tube fitting disclosed above which is more fully discussed in the Description of the Preferred Embodiment and claimed below. Rather, this invention is distinguished from the prior art by its combination of structural features which make up a unique tube fitting. Important features of this invention are shown and described below to illustrate the best mode contemplated to date of carrying out this invention.

Those skilled in the art will realize that this invention is capable of embodiments which are different from those shown in that the details of the structure of the tube fitting can be changed in various manners without departing from the scope of this invention. Accordingly, the drawings and description are to be regarded as illustrative in nature and are not to restrict the scope of the invention. Additionally, the claims are to be regarded as including such equivalent tube fittings as do not depart from the nature and scope of this invention.

BRIEF DESCRIPTION OF THE DRAWINGS

For a more complete understanding and appreciation of this invention, and many of its advantages, reference will be made to the following detailed description taken in conjunction with the accompanying drawings.

DESCRIPTION OF PREFERRED EMBODIMENTS

Figure 1:
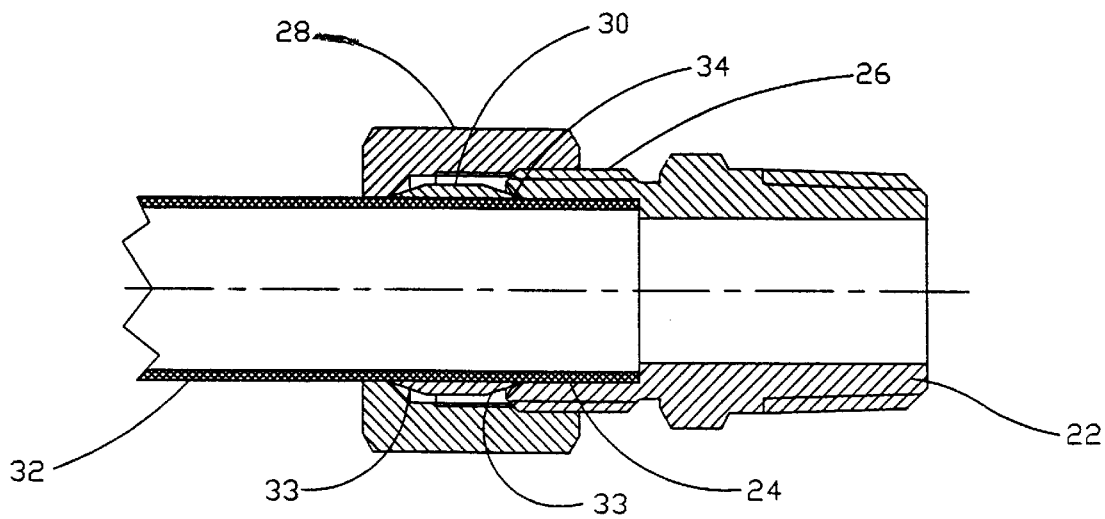
FIG. 1 is a cross sectional view of a prior art compression fitting.
Figure 2:
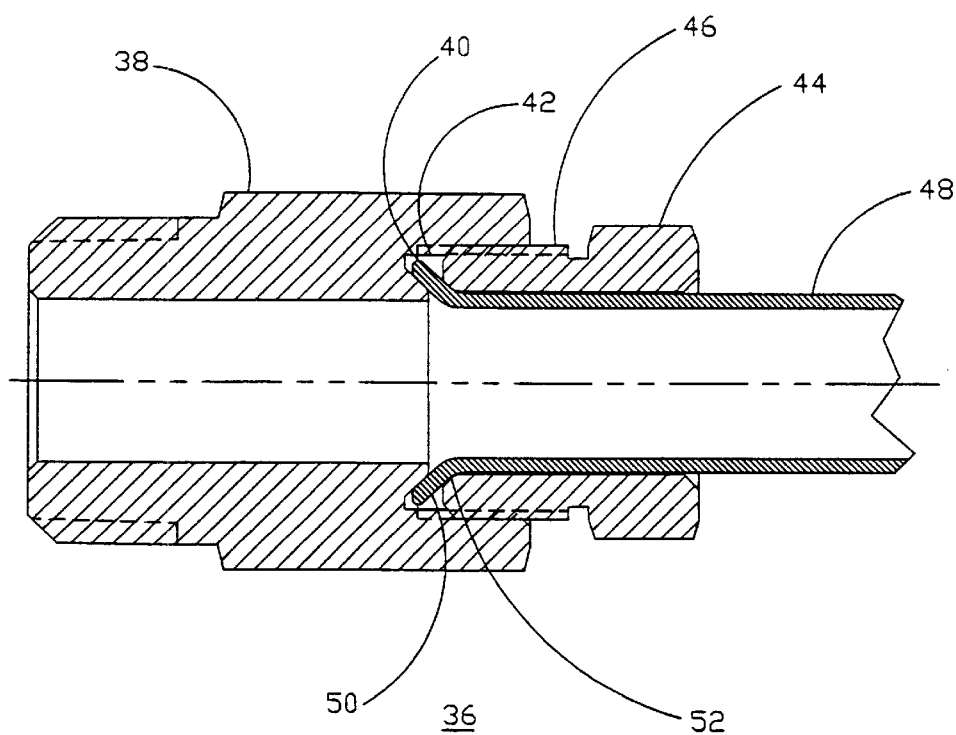
FIG. 2 is a cross sectional view of a prior art flare fitting.
Figure 3:
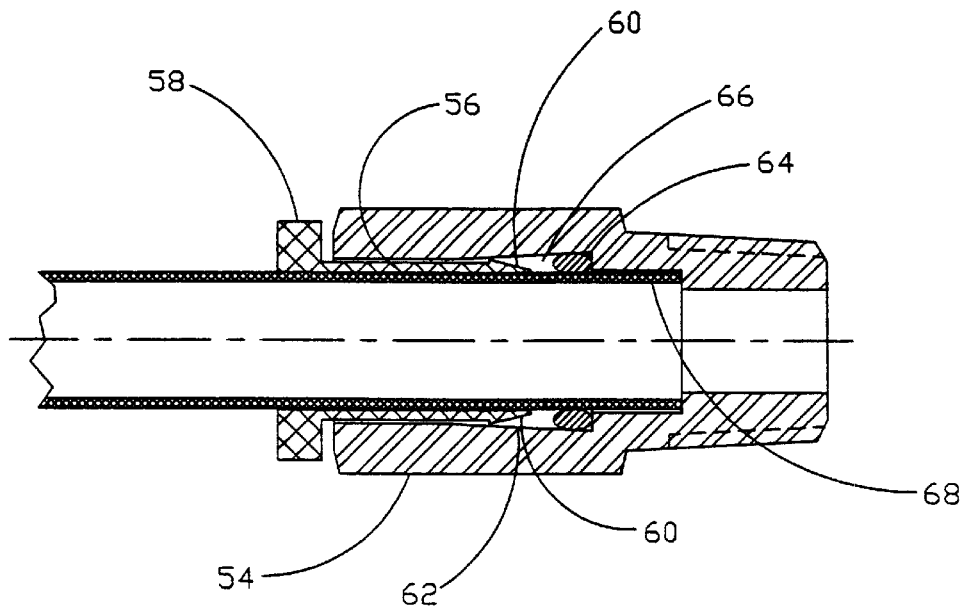
FIG. 3 is a cross sectional view of a prior art push-in tube fitting using a collet to grip tubing.
Figure 4:
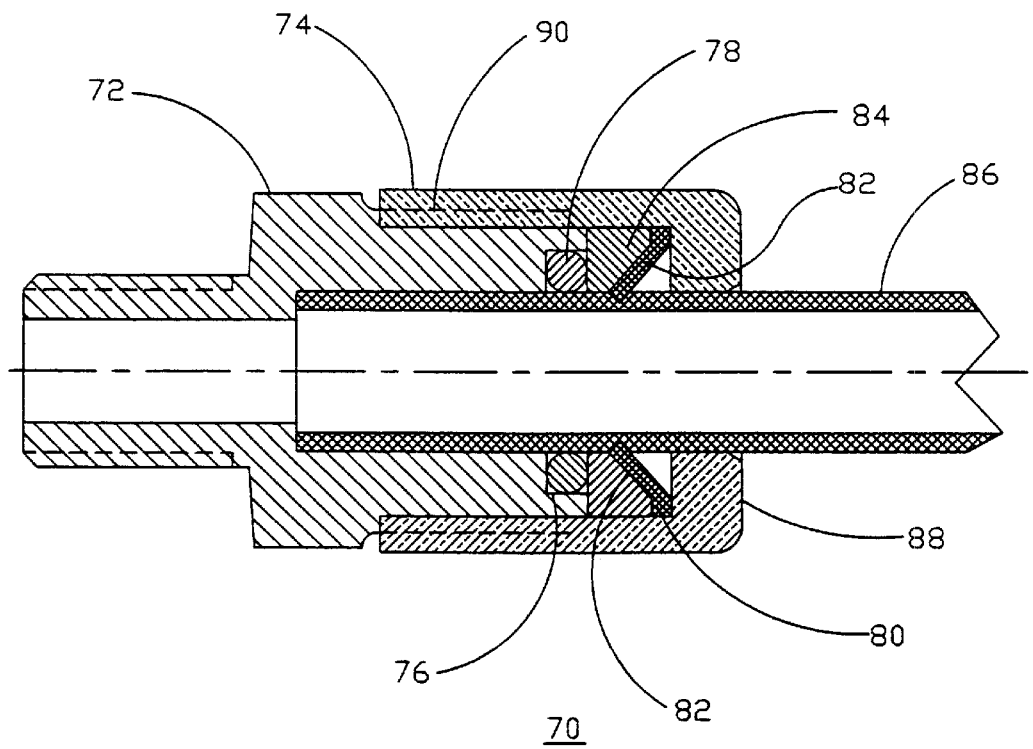
FIG. 4 is a cross sectional view of a prior art push-in fitting using a retaining ring with internally extending gripping teeth to hold tubing.

Referring now to the drawings, identical reference numerals and letters designate the same or corresponding parts throughout the several figures shown in the drawings. As shown in FIGS. 5–9, a fitting 90 is used to retain a cylindrical tubing 92 which conveys a fluid to or from a piece of equipment. The fitting 90 includes a body 94 which has screw threads 96 at one end for attaching the fitting to the equipment. As seen in FIG. 9, the body 90 has a hole 98 extending partially through it, with a cylindrically shaped main cavity 100, which receives the tubing 92, at the end of the body 94 opposite from the end with the screw threads 96. Adjacent the hole 98 is a cylindrically shaped guide cavity 102 which receives an end of the tubing 92. A tube stop 104 is a ledge formed at the end of guide cavity 102.

Figure 5:
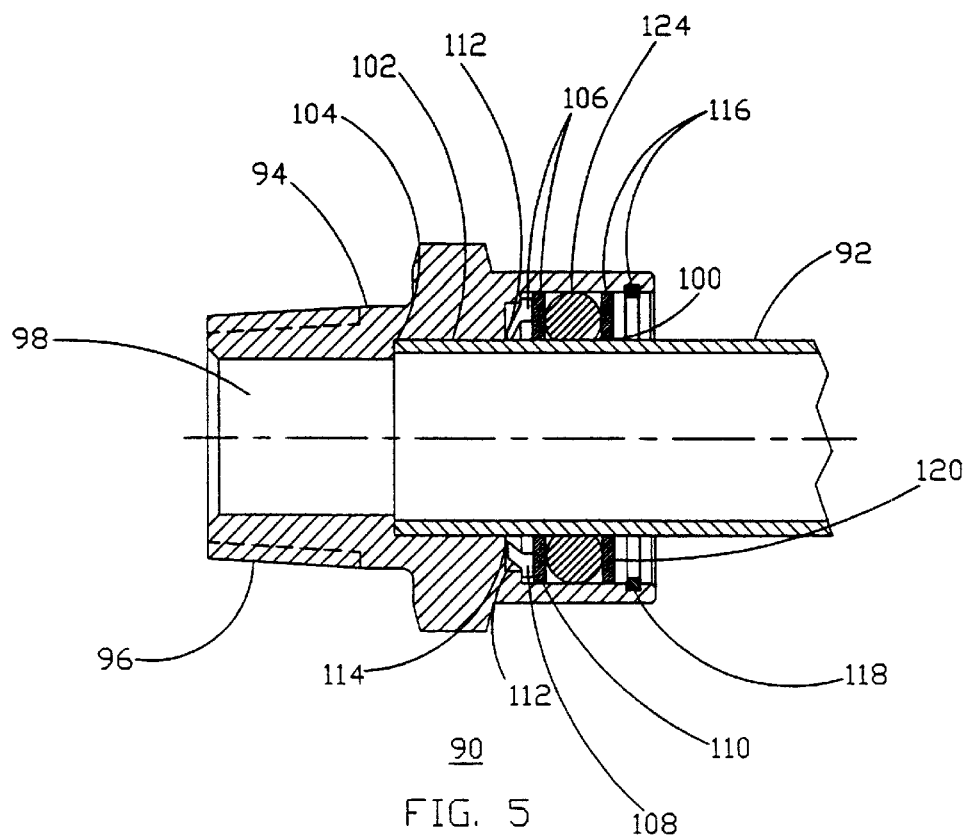
FIG. 5 is a cross sectional view of one embodiment of a tube fitting made in accordance with this invention.
Figure 6:
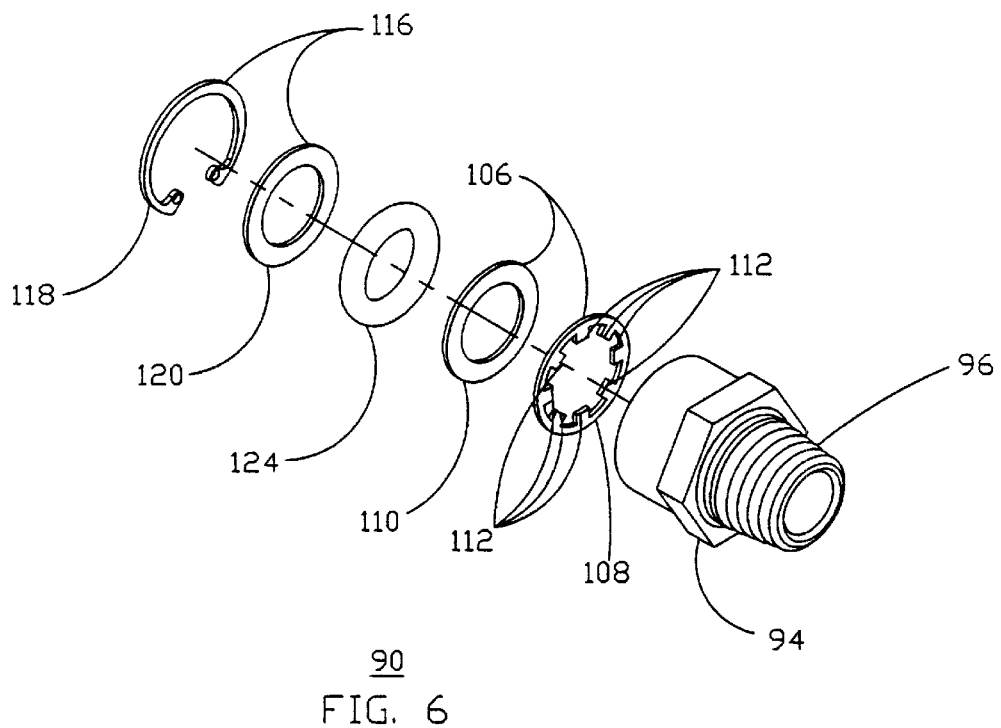
FIG. 6 is an exploded view of the tube fitting shown in FIG. 5.

Referring to FIG. 5 and FIG. 6, in accordance with this invention, a circular retaining shoulder 106 is locatable on the tubing 92 at a position within the main cavity 100 when the tubing 92 is placed in the fitting 90. In the preferred embodiment of this invention shown in FIGS. 5–9, the retaining shoulder includes a retaining ring 108 and a washer 110. The retaining ring 108 has a plurality of inwardly extending gripping teeth 112 located about its internal diameter. The body 94 has a relief bore 114 located at the internal end of the main cavity. The relief bore 114 provides room for the gripping teeth 112 to bend within the body 94 as the tube 92 is installed in the fitting 90 to allow the end of the tube 92 to be inserted beyond the shoulder 106. The teeth 112 grip the tube 92 to resist any force attempting to remove the tube 92 from the fitting 90. The retaining ring 108 can be made of any type of metal or plastic which is desirable for the application of the fitting 90. One satisfactory type of retaining ring is a beveled toothed washer made out of spring steel.

The fitting 90 also includes a closure 116 which can be installed at the open end of the main cavity 100 to hold the shoulder 106 within the main cavity 100. In the preferred embodiment of this invention shown in FIGS. 5–9, the closure 116 includes a snap ring 118 and a washer 120. A recessed groove 122, more clearly seen in FIG. 9, is machined near the open end of the main cavity 100 to hold the snap ring 118. The washer 120 is located on the inside of the snap ring.

The fitting 90 also includes an elastomeric seal 124 mounted within the main cavity 100 between the shoulder 106 and the closure 116. The washer 110 is located between the seal 124 and the retaining ring 108, while the washer 120 is mounted between the seal 124 and the snap ring 118. The washer 110 and the washer 120 protect the seal 124 from being damaged through contact with the retaining ring 108 and the snap ring 118, respectively.

The seal 124 is in the form of an O-ring which has an internal diameter and an outer diameter that cause it to be compressed between the tubing 92 and the internal surface of the main cavity 100 to prevent fluid being conveyed by the tubing 92 from leaking through the fitting 90. Those skilled in the art of designing tube fittings will recognize that the type of elastomeric material used for the seal 124 and the internal diameter, outer diameter and width of the seal 124 will depend on operating conditions in which the fitting 90 is being used. The operating conditions include the type of fluid being conveyed by the fitting and the operating temperature and pressure. The fluid being conveyed by the tube 92 is under pressure causing it to fill the main cavity 100 and will push the shoulder 106 against the seal 124. As will be explained more fully below, the O-ring seal 124 also acts as a shock absorber with respect to the movement of the shoulder 106.

Figure 7:
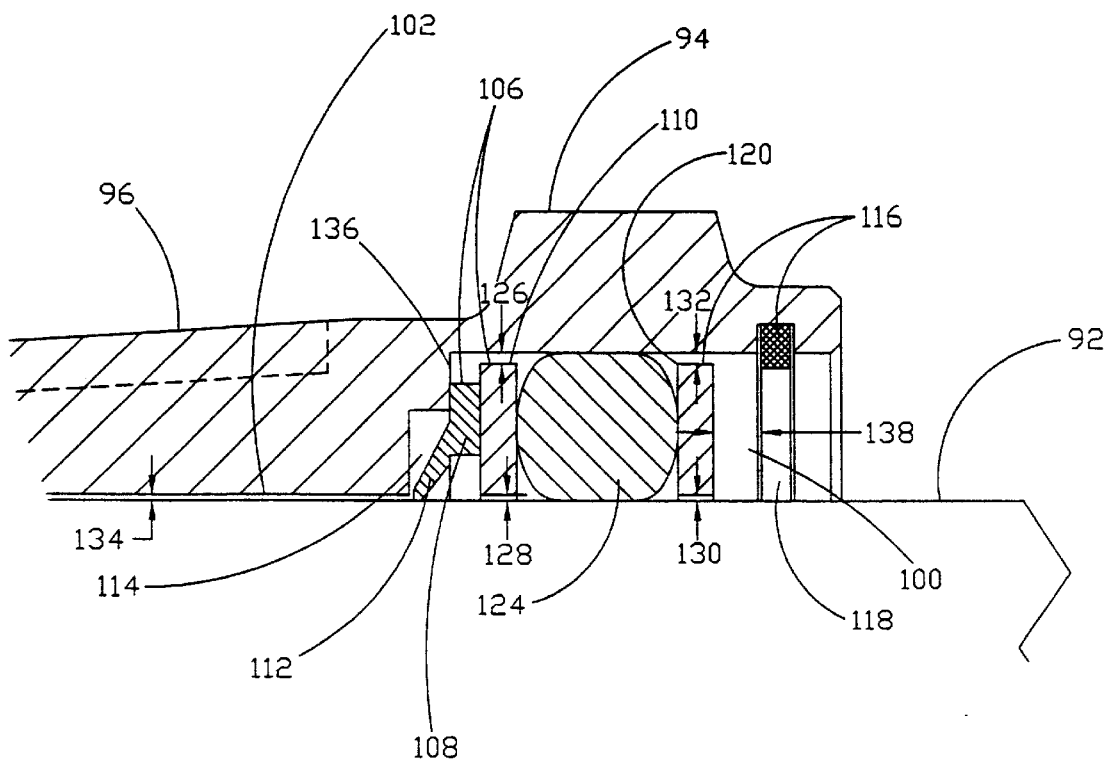
FIG. 7 is an enlarged cross sectional view of the tube fitting of FIG. 5 showing gaps between components of the fitting.

Referring now to FIG. 5 along with the enlarged section of the fittings shown in FIG. 7, the outer diameter of the retaining shoulder 106 must be smaller than the diameter of the axial wall of main cylinder 100 so as to form a preselected shoulder gap that allows radial movement of at least a portion of the shoulder 106. The washer 110 has a larger outer diameter than that of the retaining ring 108 to protect the retaining ring 108 from engaging the axial wall of the main cavity 100. Thus, the outer diameter of the washer 110 is the effective diameter of the shoulder 106. The distance between the outer diameter of the retaining shoulder 106 and the diameter of the axial wall of the main cavity 100 forms an outer clearance gap 126. Because the shoulder 106 includes the washer 110, the total, preselected shoulder gap of the retaining shoulder 106 also includes an inner clearance gap 128 between the inner diameter of the washer 110 and the outside surface of the tube 92.

Referring to FIG. 7, the diameter of the hole of the closure 116 must be larger than the outside diameter of the tubing 92 so as to form a closure gap that allows radial movement of at least a portion of shoulder 106. Since the closure 116 includes the washer 120 which has a smaller inside diameter than the snap ring 118, it is the inside diameter of the washer 120 which must be larger than the outside diameter of the tube 92 so as to form an inner clearance gap 130. Additionally, a gap 132 between the outer diameter of washer 120 and the axial surface of the main cavity 100 must be considered as part of the total, preselected closure gap of the closure 116. As can be seen in FIG. 7, the inside diameter of the snap ring 118 is so large it does not affect the radial movement of the tube 92 within the fitting 90.

The guide cavity 102 has a diameter which is sufficiently greater than the outside diameter of the tubing 92 so as to form a guide gap 134 of a preselected size. Additionally, the axial length of the main cavity 100 is larger than the combined widths of the components mounted between an inside end wall 136 of the main cavity 100 and the snap ring 118. As shown in FIGS. 7 and 9, the width $D_1$ of the main cavity 100 is larger than the sum of the width $T_R$ of the retaining ring 108, plus the width $T_W$ of the washer 110, plus the width $T_S$ of the seal 124, plus the width $T_W$ of the washer 120, to an extent which equals an axial gap 138. For illustrative purposes in FIGS. 5 and 7 the components within the main cavity 100 are shown in the position they would be in at the time the tubing 92 is first installed in the fitting 90. During normal use of the fitting it would be in a pressurized system. The fluid conveyed through the tubing 92 would push the components within the main cavity 100 against the snap ring 118.

Figure 8:
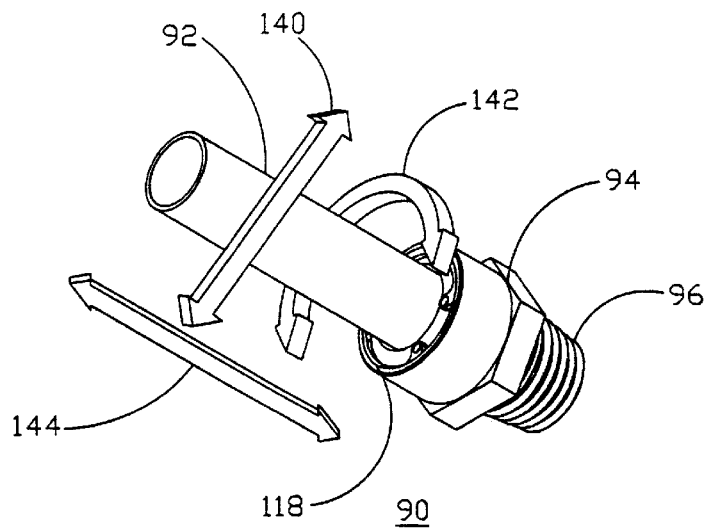
FIG. 8 is a perspective view of a fitting of this invention having tubing within it and showing three types of play which occur.
Figure 9:
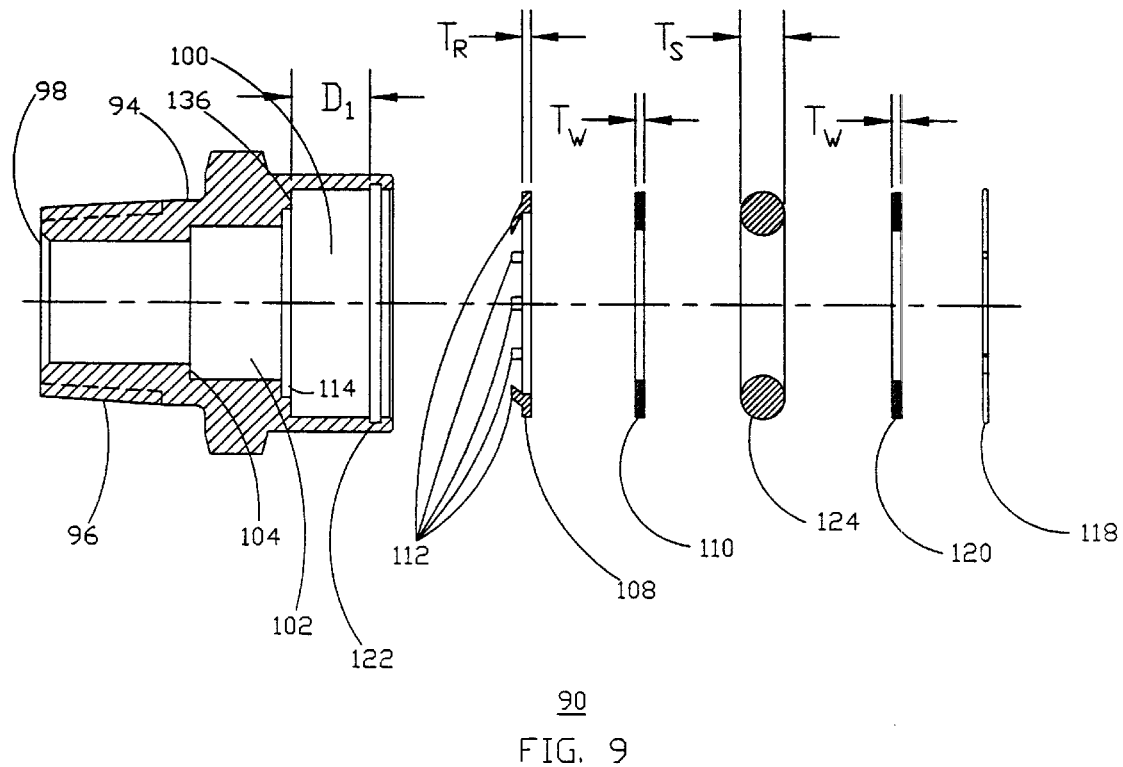
FIG. 9 is an exploded, cross sectional view of the fitting shown in FIG. 5 with measurements depicted for axial play.

Referring to FIG. 8 along with FIG. 7, the gaps described above provide substantially unimpeded motion, that is play, between the shoulder 106 and the main cavity 100 which is dampened by the seal 124. The shoulder gap, which is the sum of the outer clearance gap 126 and the inner clearance gap 128, the closure gap, which is the sum of the inner clearance gap 130 and the outer clearance gap 132, and the guide gap 134 allow movement of at least a portion of the shoulder 106, primarily the retaining ring 108, in a substantially radial direction within the main cylinder 100, which we will call side play. This results in an allowable sideways movement of the tube 92 in a direction shown by an arrow 140 in FIG. 8. Because of these gaps which allow the side play, the shoulder 106 can be rotated within the main cavity 100 resulting in rotational play of the shoulder 106. This results in allowable rotation of the tube 92 as represented by the arrow 142. The axial gap 138 allows an axial movement of at least a portion of the shoulder 106, against primarily the retaining ring 108, within the main cavity 100, between the wall 136 and the seal 124 resulting in axial play of the shoulder 106. This axial play provides allowable axial movement of the tube 92 as shown by the arrow 144 in FIG. 8.

Since pressure of the fluid in which the fitting 90 is installed forces the fitting components against the snap ring 118 and normally holds the retaining ring 108 against the washer 110, the retaining ring 108 normally does not strike the end wall 136. Movement of the tube 92 moves the retaining ring 108 to and from the washer 110. The combination of side play and axial play allows an angular movement of the tubing 92 with respect to the axis of the fitting 90. The seal 124 behind the washer 110 absorbs some of the shock of the movement at the area of the tube 92 which is engaged by the teeth 112 of the retaining ring 108. The amount of side play and amount of axial play must be sufficient to minimize any fatigue resulting from movement of the tube 92 which occurs at the area on tube 92 which is engaged by the teeth 112. Minimizing fatigue in this area prevents an early failure of the tube 92, allowing tubing made of copper or another desirable metal to be used with the fitting 90.

The actual sizes of the clearance gaps 126, 128, 130 and 132 and the guide gap 134 which produce side play and the size of the axial gap 138 which produces axial play are determined empirically. It has been found that for a fitting used to connect one quarter inch copper tubing to a compressor, the total side play, that is the total of the gaps 126 and 128 and the total of the gaps 130 and 132 and the size of the gap 134 should each equal between about 0.010 inches and about 0.020 inches, and a satisfactory gap 138 which produces axial play is between about 0.032 inches and about 0.0625 inches. It is expected that these values will vary from fitting to fitting and among different applications of the fittings.

Figure 10:
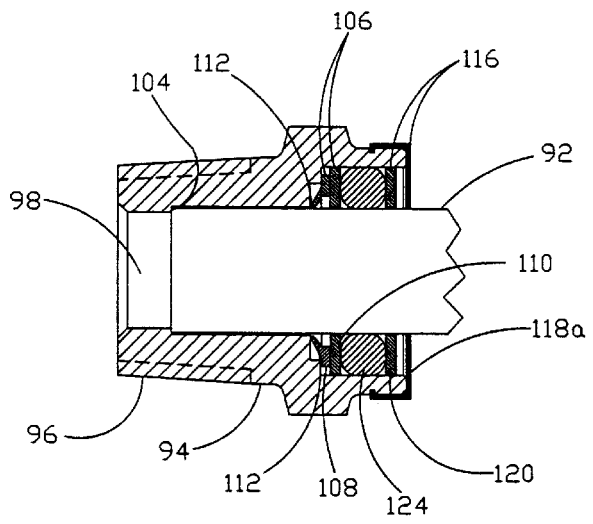
FIG. 10 is a cross sectional view of a fitting of the type shown in FIG. 5 with an alternate closure for the main cavity.
Figure 11:
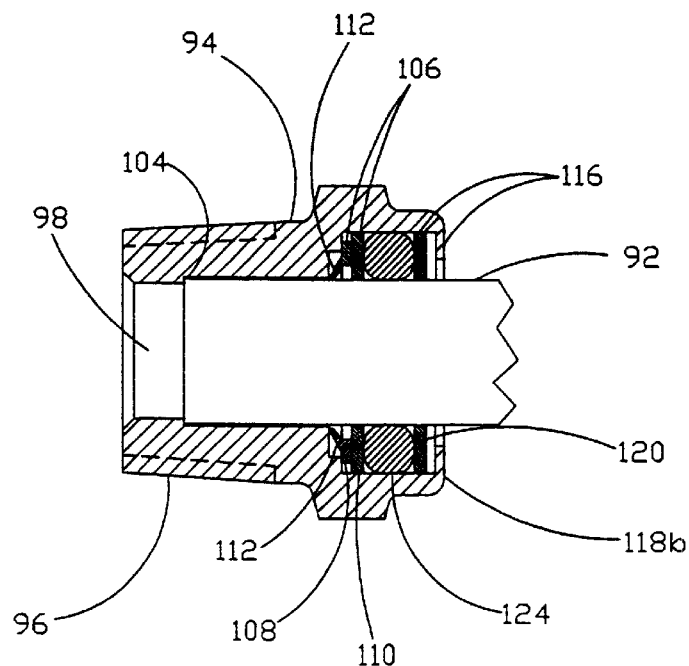
FIG. 11 is a cross sectional view of a fitting of the type shown in FIG. 5 with an alternate type of closure for the main cavity.

FIGS. 10–17 show some of the numerous fitting configurations which can be made in accordance with the principles of this invention. FIG. 10 shows a fitting in which the closure 116 includes a spring cap 118a used in place of the snap ring 118 shown in FIGS. 5–9. FIG. 11 shows a fitting 90 in which the closure 116 includes a lip 118b of the body 94 which was extending in an axial direction before the retaining ring 108, the washers 110 and 120, and the seal 124 were inserted in the main cavity 100. This lip 118b is then bent inwardly until it extends radially about the opening of the main cavity 100 as shown in FIG. 11.

Figure 12:
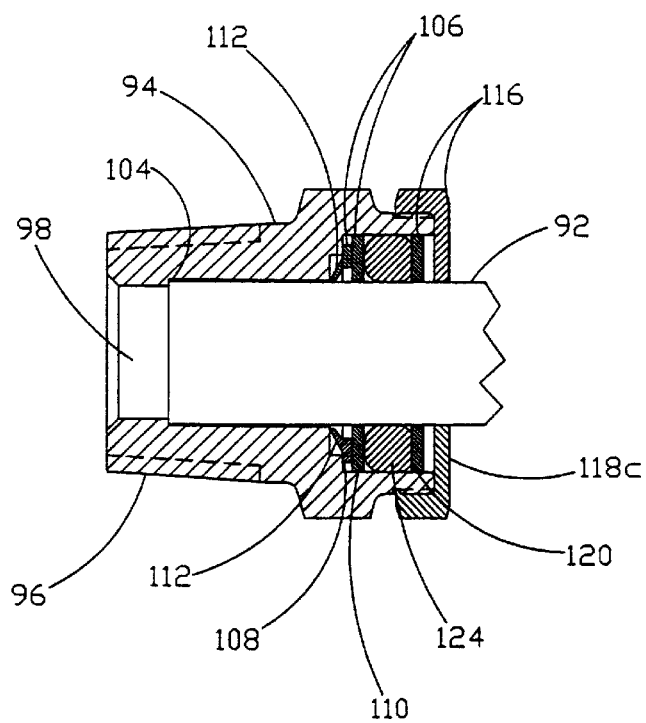
FIG. 12 is a cross sectional view of a fitting of the type shown in FIG. 5 with an alternative type of closure.

FIG. 12 depicts the fitting 90 in a configuration in which the closure 116 includes a screw cap 118c which is used in place of the snap ring 118. In this configuration, the end of the body 94 which surrounds the main cavity 100 has screw threads about its outside periphery. The screw cap is installed on these screw threads after the other components of the fitting 90 are inserted into the main cavity 100.

Figure 13:
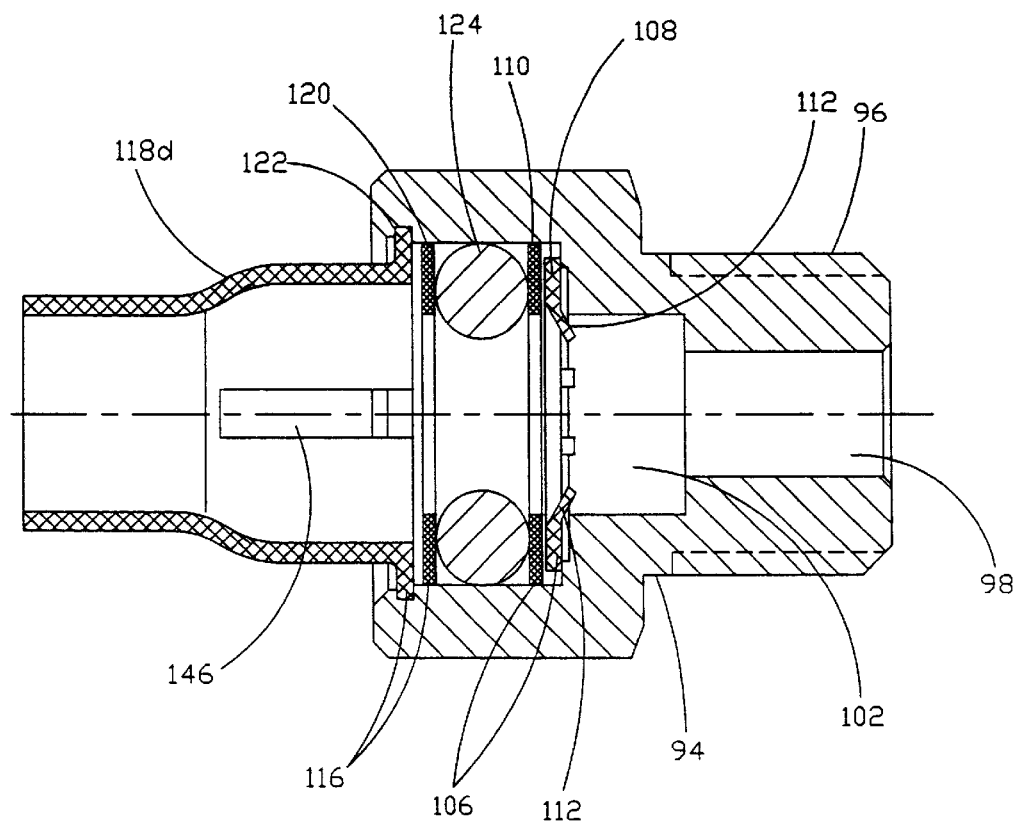
FIG. 13 is a cross sectional view of a fitting made in accordance with this invention.

FIG. 13 shows a fitting 90 in which a cylindrical housing 118d is used in place of the snap ring 118 in the closure 116. This housing 118d can be used to support a length of tubing, not shown, to be retained by the fitting 90. The housing 118d can have one or more slots 146 in the end which is inserted into the recessed groove 122 to enable this end of the housing to be compressed sufficiently to fit into the groove 122.

Figure 14:
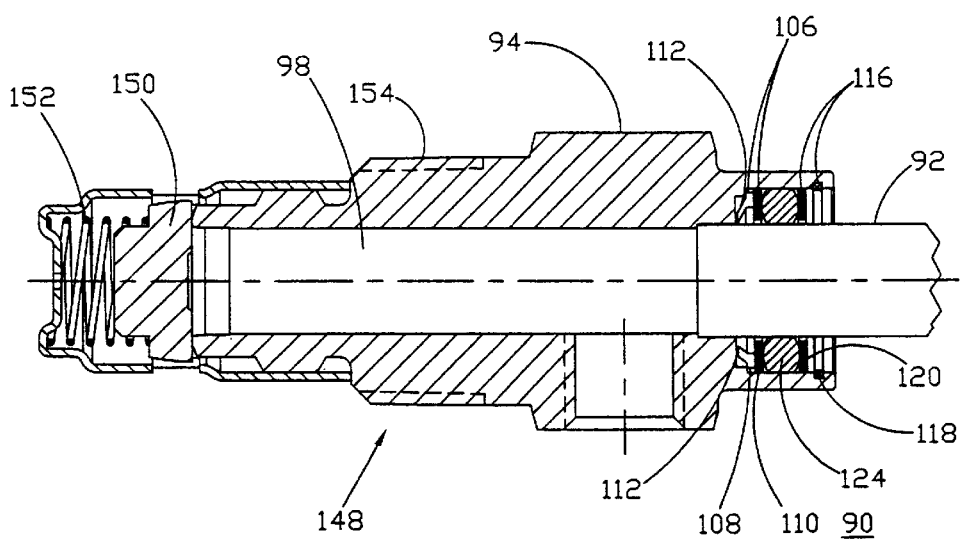
FIG. 14 is a cross sectional view of a fitting made in accordance with this invention which is incorporated into a valve.

FIG. 14 is intended to show that the fitting 90 can be incorporated into other components used with various types of equipment. FIG. 14 shows the fitting 90 incorporated into one end of a check valve 148 used as a component of a compressor system. The actual structure and operation of this valve in and of themselves are not significant to this invention. Suffice it to say that the fitting 90 connects the tubing 92 to the hole 98 which extends to poppet valve 150 that is held in a normally closed position by a spring 152. The body 94 includes screw threads 154 which allow the check valve 148 to be mounted into a compressor tank to enable compressed air to be conveyed through tubing 92 from a compressor pump to a compressor tank. As can be seen from FIG. 14, the fitting 90 can be used as part of a valve or other component to which a tube must be connected.

Figure 15:
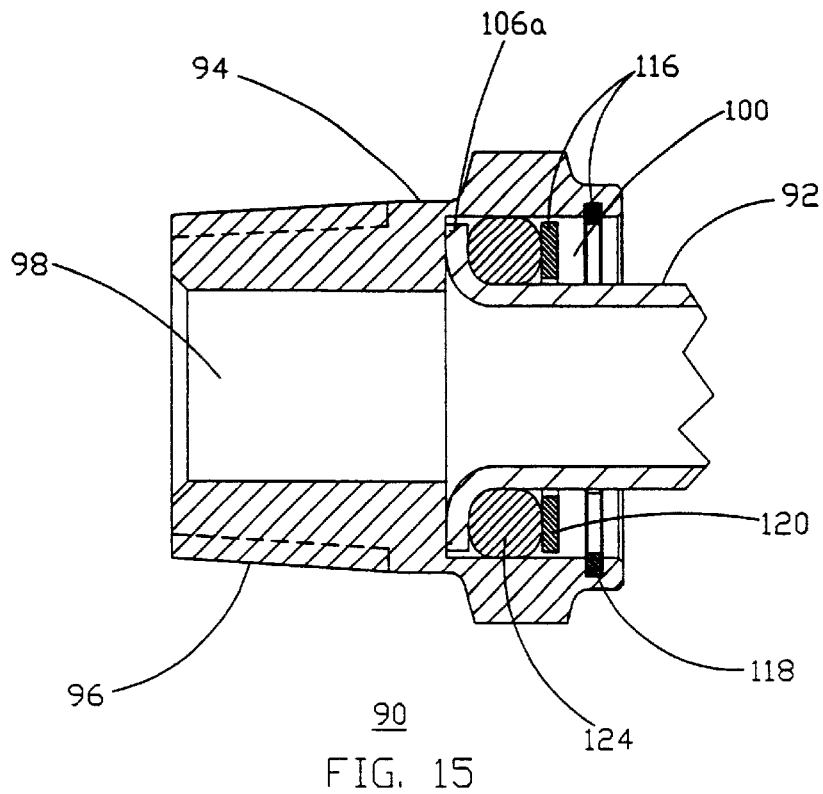
FIG. 15 is a cross sectional view of another fitting made in accordance with this invention.
Figure 16:
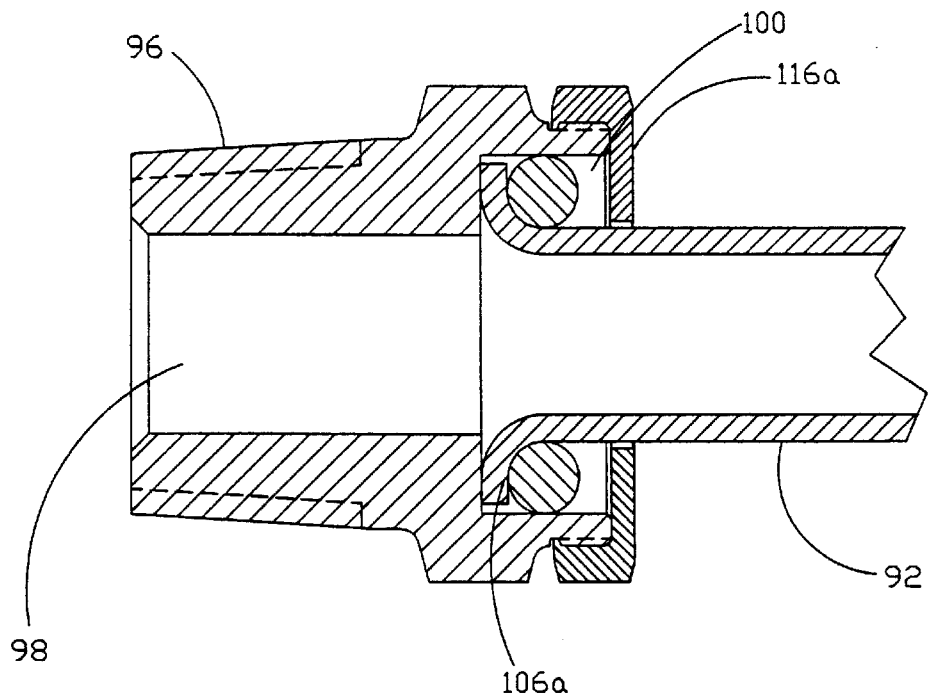
FIG. 16 is a cross sectional view of another embodiment of a fitting made in accordance with this invention.

FIGS. 15 and 16 show configurations of the fitting 90 in which the retaining shoulder consists of a flare 106a at the end of tubing 92. As a result of the structure of the flare, the shoulder 106a does not have to include a washer to protect the seal 124. Thus, the total clearance gap of the shoulder 106a is the gap between the radial end of the shoulder 106a and the axially extending surface of the main cavity 100.

The configuration of the fitting 90 in FIG. 16 includes the flare as the retaining shoulder 106a, as well as a closure 116a which comprises only a screw cap identical to the screw cap 118c shown in FIG. 12. It is believed that for some applications of this invention, it may not be necessary to use a washer as a component of the closure for the main cavity. The clearance gap for the closure would simply be the gap between the diameter of the hole within the screw cap 116a and the outside diameter of the tubing 92.

Figure 17:
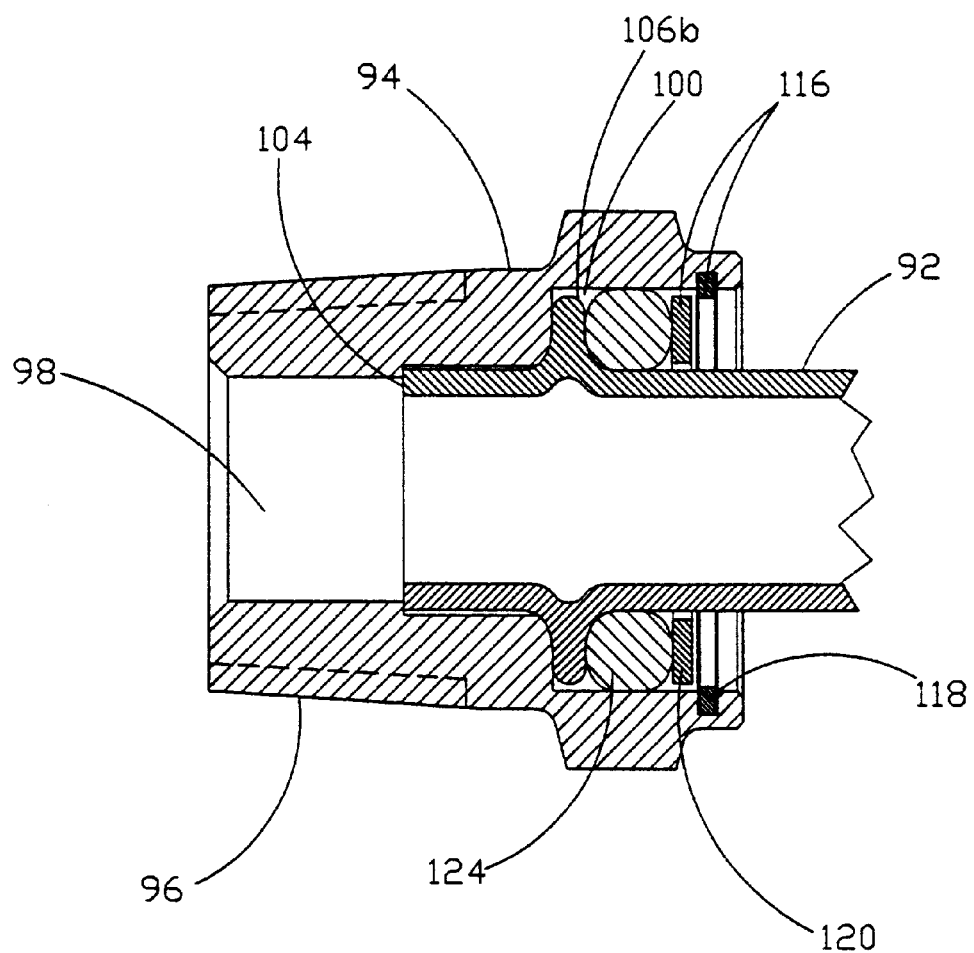
FIG. 17 is a cross sectional view of still another embodiment of a fitting made in accordance with this invention.

FIG. 17 shows yet another of the numerous types of retaining shoulders which can be used for the fitting 90 in accordance with the principles of this invention. Retaining shoulder 106b comprises a crimp near the end of the tubing 92. Because of the structure of the crimp shown in FIG. 17, it is not necessary to use a washer as part of the fitting 90 shown in FIG. 17. Thus, the clearance gap of the retaining shoulder 106b is the gap between the radial end of the crimp in the tubing forming the shoulder 106b and the axially extending surface of the main cavity 100.

Many other modifications and changes can be made to the tube fitting of this invention by those skilled in the art of designing tube fittings, without departing from the spirit and scope of this invention. Thus, the claims when appended are intended to be interpreted to cover such equivalent tube fittings as do not depart from the spirit and scope of this invention.

What is claimed is:

1. A fitting for retaining a tube which is to be inserted into the fitting after the fitting is assembled, comprising:

a body, said body having a hole extending through it, said hole comprising a cylindrical main cavity having an open end which allows an end of the tube to be inserted into said hole and an internal end within said body, said main cavity having a cylindrical inner wall, said hole further including a cylindrical guide cavity located after said internal end of said main cavity to receive the tube after the tube has been inserted through said main cavity, said guide cavity having a guide cavity wall and a diameter which is sufficiently larger than the outer diameter of the tube so as to form a preselected guide cavity gap;

a retaining ring having a plurality of inwardly extending teeth located within said main cavity, said teeth forming an inside diameter which causes said teeth to engage and hold the tube when the tube is placed in said hole; said retaining ring having a width and having an outer diameter which is sufficiently smaller than the diameter of said main cavity so as to form a preselected retaining ring clearance gap;

a closure installable at said open end of said main cavity for holding said retaining ring within said main cavity, said closure having a circular closure hole within it of a size which enables said closure hole to receive the tube after said closure is installed at the open end of said main cavity; said closure hole having a diameter which is sufficiently larger than the outside diameter of the tube so as to form a preselected closure clearance gap;

an elastomeric seal mounted within said main cavity between said retaining ring and said closure, said seal having a width and having an inner diameter and an outer diameter that cause said seal to be compressed between the tube and said inner wall of said main cavity;

a first circular washer located within said main cavity between said retaining ring and said seal, said first circular washer having a width, a first inner diameter and a first outer diameter, the first inner diameter being larger than the outside diameter of the tube so as to form a preselected first inner gap and the first outer diameter being less than the diameter of said main cylinder so as to form a preselected first outer gap, with the sum of the first inner gap and the first outer gap constituting a first washer clear gap, a second circular washer located within said main cavity between said seal and said closure, said second circular washer having a width, a second inner diameter and a second outer diameter, the second inner diameter being larger than the outside diameter of the tube so as to form a preselected second inner gap and the second outer diameter being less than the diameter of said main cylinder to form a preselected second outer gap, the sum of the second inner gap and the second outer gap constituting a second washer clearance gap;

said main cavity having an axial length which is sufficiently larger than the combined widths of said retaining ring, said first washer, said second washer and said seal so as to form a preselected axial gap; the closure clearance gap, the first washer clearance gap, the second washer clearance gap, the retaining ring clearance gap and the guide cavity gap, each having a size which allows sufficient side play between the tube and said fitting and the axial gap allowing sufficient axial play between the tube and said fitting so that the side play and the axial play enable said retaining ring to move freely within said main cavity to an extent that minimizes fatigue on the tube within said main cavity.

2. A fitting for retaining a tube which is to be inserted into the fitting after the fitting is assembled according to claim 1 in which said first outer diameter of said first circular washer is sufficiently larger than the outer diameter of said retaining ring so as to protect said retaining ring from engaging said cylindrical inner wall of said main cavity.

3. A fitting for retaining a tube which is to be inserted into the fitting after the fitting is assembled according to claim 1 in which said first outer diameter of said first circular washer is sufficiently larger than the outer diameter of said retaining ring so as to protect said retaining ring from engaging said cylindrical inner wall of said main cavity and said closure comprises a snap ring installable at said open end of said main cavity.

4. A fitting for retaining a tube which is to be inserted into the fitting after the fitting is assembled according to claim 1 in which said first outer diameter of said first circular washer is sufficiently larger than the outer diameter of said retaining ring so as to protect said retaining ring from engaging said cylindrical inner wall of said main cavity and said hole includes a relief bore at said inside end of said main cavity between said main cavity and said guide cavity, said relief bore providing room for said gripping teeth to bend within said body as the tube is being inserted into said hole.

5. A fitting for retaining a tube which is to be inserted into the fitting after the fitting is assembled according to claim 1 in which the preselected axial gap, the closure clearance gap, the first washer clearance gap, the second washer clearance gap, the retaining ring clearance gap, and the guide cavity gap each have a size which allows sufficient rotational play between the tube and said fitting so that the rotational play enables said retaining ring to move freely within said main cavity to an extent that minimizes fatigue on the tube within said main cavity.

6. A fitting for retaining a tube which is to be inserted into the fitting after the fitting is assembled, comprising:

a body, said body having a hole extending through it, said hole comprising a cylindrical main cavity having an open end which allows an end of the tube to be inserted into said hole and an internal end within said body, said main cavity having a cylindrical inner wall, said hole further including a cylindrical guide cavity located after said internal end of said main cavity to receive the tube after the tube has been inserted through said main cavity, said guide cavity having a guide cavity wall and a diameter which is sufficiently larger than the outer diameter of the tube so as to form a preselected guide cavity gap;

a retaining ring having a plurality of inwardly extending teeth located within said main cavity, said teeth forming an inside diameter which causes said teeth to engage and hold the tube when the tube is placed in said hole; said retaining ring having a width and having an outer diameter which is sufficiently smaller than the diameter of said main cavity so as to form a preselected retaining ring clearance gap;

said hole includes a relief bore at said inside end of said main cavity between said main cavity and said guide cavity, said relief bore providing room for said gripping teeth to bend within said body as the tube is being inserted into said hole;

a closure installable at said open end of said main cavity for holding said retaining ring within said main cavity, said closure having a circular closure hole within it of a size which enables said closure hole to receive the tube after said closure is installed at the open end of said main cavity; said closure hole having a diameter which is sufficiently larger than the outside diameter of the tube so as to form a preselected closure clearance gap;

an elastomeric seal mounted within said main cavity between said retaining ring and said closure, said seal having a width and having an inner diameter and an outer diameter that cause said seal to be compressed between the tube and said inner wall of said main cavity;

a first circular washer located within said main cavity between said retaining ring and said seal, said first circular washer having a width, a first inner diameter and a first outer diameter, the first inner diameter being larger than the outside diameter of the tube so as to form a preselected first inner gap and the first outer diameter being less than the diameter of said main cylinder so as to form a preselected first outer gap, with the sum of the first inner gap and the first outer gap constituting a first washer clearance gap; a second circular washer located within said main cavity between said seal and said closure, said second circular washer having a width, a second inner diameter and a second outer diameter, the second inner diameter being larger than the outside diameter of the tube so as to form a preselected second inner gap and the second outer diameter being less than the diameter of said main cylinder to form a preselected second outer gap, the sum of the second inner gap and the second outer gap constituting a second washer clearance gap, said first outer diameter of said first circular washer is sufficiently larger than the outer diameter of said retaining ring so as to protect said retaining ring from engaging said cylindrical inner wall of said main cavity and said closure comprises a snap ring installable at said open end of said main cavity;

said main cavity having an axial length which is sufficiently larger than the combined widths of said retaining ring, said first washer, said second washer and said seal so as to form a preselected axial gap, the closure clearance gap, the first washer clearance gap, the second washer clearance gap, the retaining ring clearance gap and the guide cavity gap, each having a size which allows sufficient side play and rotational play between the tube and said fitting and said axial gap allowing sufficient axial play between the tube and said fitting so that the side play, the rotational play, and the axial play enable said retaining ring to move freely within said main cavity to an extent that minimizes fatigue on the tube within said main cavity.

7. A fitting for retaining a tube which is to be inserted into the fitting after the fitting is assembled, comprising:

a body, said body having a hole extending through it, said hole comprising a cylindrical main cavity having an open end which allows an end of the tube to be inserted into said hole and an internal end within said body, said main cavity having a cylindrical inner wall, said hole further including a cylindrical guide cavity located after said internal end of said main cavity to receive the tube after the tube has been inserted through said main cavity, said guide cavity having a guide cavity wall and a diameter which is sufficiently larger than the outer diameter of the tube so as to form a preselected guide cavity gap;

a retaining ring having a plurality of inwardly extending teeth located within said main cavity, said teeth forming an inside diameter which causes said teeth to engage and hold the tube when the tube is placed in said hole; said retaining ring having a width and having an outer diameter which is sufficiently smaller than the diameter of said main cavity so as to form a preselected retaining ring clearance gap;

a closure installable at said open end of said main cavity for holding said retaining ring within said main cavity, said closure having a circular closure hole within it of a size which enables said closure hole to receive the tube after said closure is installed at the open end of said main cavity; said closure hole having a diameter which is sufficiently larger than the outside diameter of the tube so as to form a preselected closure clearance gap;

an elastomeric seal mounted within said main cavity between said retaining ring and said closure, said seal having a width and having an inner diameter and an outer diameter that cause said seal to be compressed between the tube and said inner wall of said main cavity;

said main cavity having an axial length which is sufficiently larger than the combined widths of said retaining ring and said seal so as to form a preselected axial gap; the closure clearance gap, the retaining ring clearance gap and the guide cavity gap, each having a size which allows sufficient side play between the tube and said fitting and the axial gap allowing sufficient axial play between the tube and said fitting so that the side play and the axial play enable said retaining ring to move freely within said main cavity to an extent that minimizes fatigue on the tube within said main cavity.

8. A fitting for retaining a tube which is to be inserted into the fitting after the fitting is assembled according to claim 7 which further includes a circular washer located within said main cavity between said retaining ring and said seal, said circular washer having a width, an inner diameter and an outer diameter, said inner diameter being larger than the outside diameter of the tube so as to form a preselected inner gap and the outer diameter being less than the diameter of the main cylinder to form a preselected outer gap, the sum of the inner gap and the outer gap constituting a washer clearance gap, and the axial length of said main cavity being sufficiently larger than the combined widths of said retaining ring, said washer and said seal so as to form the preselected axial gap; and the washer clearance gap having a size which, along with the closure clearance gap, the retaining ring clearance gap and the guide cavity gap, allows sufficient side play between the tube and said fitting, and the axial gap allowing sufficient axial play between the tube and said fitting so that the side play and the axial play enable said retaining ring to move freely within said main cavity to an extent that minimizes fatigue on the tube within said main cavity.

9. A fitting for retaining a tube which is to be inserted into the fitting after the fitting is assembled according to claim 8 in which the outer diameter of said circular washer is sufficiently larger than the outer diameter of said retaining ring so as to protect said retaining ring from engaging said cylindrical inner wall of said main cavity.

10. A fitting for retaining a tube which is to be inserted into the fitting after the fitting is assembled according to claim 7 which further includes a circular washer located within said main cavity between said seal and said closure, said circular washer having a width, an inner diameter and an outer diameter, the inner diameter being larger than the outside diameter of the tube so as to form a preselected inner gap and the outer diameter being less than the diameter of the main cylinder to form a preselected outer gap, the sum of the inner gap and the outer gap constituting a washer clearance gap, and the axial length of said main cavity being sufficiently larger than the combined widths of said retaining ring, said washer and said seal so as to form the preselected axial gap; and the washer clearance gap having a size which, along with the closure clearance gap, the retaining ring clearance gap and the guide cavity gap, allows sufficient side play between the tube and said fitting, and the axial gap allowing sufficient axial play between the tube and said fitting so that the side play and the axial play enable said retaining ring to move freely within said main cavity to an extent that minimizes fatigue on the tube within said main cavity.

* * * * *